(12) United States Patent
Bhattacharyay et al.

(10) Patent No.: US 7,995,842 B2
(45) Date of Patent: Aug. 9, 2011

(54) SYSTEM AND METHOD FOR BINARY PERSISTENCE FORMAT FOR A RECOGNITION RESULT LATTICE

(75) Inventors: Subha Bhattacharyay, Bellevue, WA (US); Haiyong Wang, Bellevue, WA (US); Jamie N. Wakeam, Redmond, WA (US); Jerome J. Turner, Redmond, WA (US); Sebastian Poulose, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 12/689,039

(22) Filed: Jan. 18, 2010

(65) Prior Publication Data
US 2010/0119151 A1 May 13, 2010

Related U.S. Application Data

(63) Continuation of application No. 11/112,697, filed on Apr. 21, 2005, now Pat. No. 7,680,333.

(51) Int. Cl.
*G06K 9/00* (2006.01)
(52) U.S. Cl. ...................................... 382/188
(58) Field of Classification Search .......... 382/116, 382/138, 140, 159, 161, 165, 170, 181–231, 382/276, 278, 286, 309, 310, 314, 316, 317, 382/319; 704/252, 256.1, 256.2, 256.3, 256.4, 704/256.5, 244, 246, 247, 251, 270; 706/15, 706/20
See application file for complete search history.

(56) References Cited

U.S. PATENT DOCUMENTS

| | | | |
|---|---|---|---|
| 4,138,662 A | 2/1979 | Shimoyama | 382/317 |
| 5,384,722 A | 1/1995 | Dulong | 708/201 |
| 5,526,476 A | 6/1996 | Motokado et al. | 345/471 |
| 5,528,003 A | 6/1996 | Bodin et al. | 172/18 |
| 5,530,907 A | 6/1996 | Pavey et al. | 710/69 |
| 5,940,189 A | 8/1999 | Matsubara et al. | 358/440 |
| 5,987,171 A | 11/1999 | Wang | 382/173 |
| 6,731,444 B2 | 5/2004 | Teng et al. | 360/48 |
| 7,039,234 B2 | 5/2006 | Geidl et al. | 382/187 |
| 7,680,333 B2 * | 3/2010 | Bhattacharyay et al. | 382/188 |
| 2003/0215139 A1 | 11/2003 | Shilman et al. | 382/186 |
| 2005/0222998 A1 | 10/2005 | Driessen et al. | 707/4 |

OTHER PUBLICATIONS

Fukushima et al., Online Writing-Box-Free Recognition of Handwritten Japanese Text Considering Character Size Variations, 2000, IEEE:Proceedings: 15th International Conference on Pattern Recognition, vol. 2, pp. 359-363.*

Ciressan et al., An FPGA-Based Coprocessor for the Parsing of Context-Free Grammars, 2000, 2000 IEEE Symposium on Field-Programmable Custom Computing Machines, pp. 236-245.*

(Continued)

*Primary Examiner* — Brian P Werner
*Assistant Examiner* — Dennis Rosario
(74) *Attorney, Agent, or Firm* — Merchant & Gould

(57) ABSTRACT

A system and method for storing document data in a serialized binary format recognition lattice structure so that the data is accessible to other applications. The lattice structure is generated that includes root node data. Child nodes correspond to columns of the recognition lattice. Each node includes a descriptor that is a collection of flags indicating presence of specific components of the node. The child nodes may include grandchild nodes with similar structure corresponding to elements within the columns. Each node further includes property information associated with the node. The recognition lattice is stored in a serial binary data format.

20 Claims, 6 Drawing Sheets

OTHER PUBLICATIONS

Marukawa et al., A High Speed Word Matching Algorithm for Handwritten Chinese Character Recognition, IAPR Workshop on Machine Vision Applications, Nov. 28-30, 1990, pp. 445-449.*

Yu et al., Segmentation and recognition of Chinese bank check amounts, 2001, Springer-Verlag: International Journal on Document Analysis and Recognition, pp. 207-217.

* cited by examiner

SYSTEM AND METHOD FOR BINARY PERSISTENCE FORMAT FOR A RECOGNITION RESULT LATTICE

RELATED APPLICATIONS

This application claims is a continuation of application Ser. No. 11/112,697, filed Apr. 21, 2005, the benefit of the earlier filing date is hereby claimed under 35 U.S.C. §120.

BACKGROUND OF THE INVENTION

Tablet PCs typically allow a user to draw or write directly on the screen. This drawing or writing is generally referred to as "inking." Inking is a type of user input and may include a touch screen and a user engaging a computing pen and writing on a screen as if writing with a traditional pen and paper. Inking is used with a wide variety of applications. For example, inking may be used in drawing applications, painting applications, word processing applications, credit card signature applications, and the like.

Inking may include more than just a visual representation of pen strokes; it may include a data type. While data structures are known, the size of the data structure used to store information may become excessively large and cumbersome. Also, document structure compatibility between programs increases efficiency and general usability of the computer. Compatibility, however, may be an issue where a user desires to transfer ink data from one application to another ink application.

An analyzer application may analyze strokes of handwriting and provide a document structure corresponding to the strokes. The document structure of the analysis may include a tree representation of the strokes. For example, the tree may contain paragraph, line and word information. The richness of the tree may increase as the complexity of the ink document increases.

SUMMARY OF THE INVENTION

Aspects of the present invention relate to a system and method for providing a binary persistence format for a recognition result lattice. Recognition results, usually from an ink analyzer application or any application that uses recognizers to recognize digital ink data, are structured in a lattice format that enables efficient storage and access of recognition results such as top element, recognized string, stroke numbers, possible combinations, properties of recognized elements, and the like. Due to large amount of data associated with recognition results, the lattice is arranged to store units of recognition results based on a hierarchical tree structure. Each unit includes information associated with recognition content, properties, relationship to other units, and the like. The lattice structure is then serialized into a binary persistence format for further processing and sharing between two applications.

In accordance with one aspect, a method is provided whereby a first data field is generated for storing size data associated with the entire serialized recognition data. The method further includes generating a second data field for storing lattice descriptor data. The lattice descriptor data is a combination of flags that indicate the characteristic of the recognition data as saved in the lattice structure. A third data field is then generated which stores the actual serialized data for the recognition lattice, referred henceforth as Root Node Data. The root node data includes information associated with column count of the lattice structure. Additional data fields are also generated for storing child node data based on the column count of the lattice structure. Each additional data field includes information associated with a column of the lattice structure.

According to a further aspect, the method may also include generating further data fields for storing grandchild node data based on elements of each column. The further data fields are structured within the additional data fields such that the elements of each column are associated with that column.

DETAILED DESCRIPTION

Embodiments of the present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
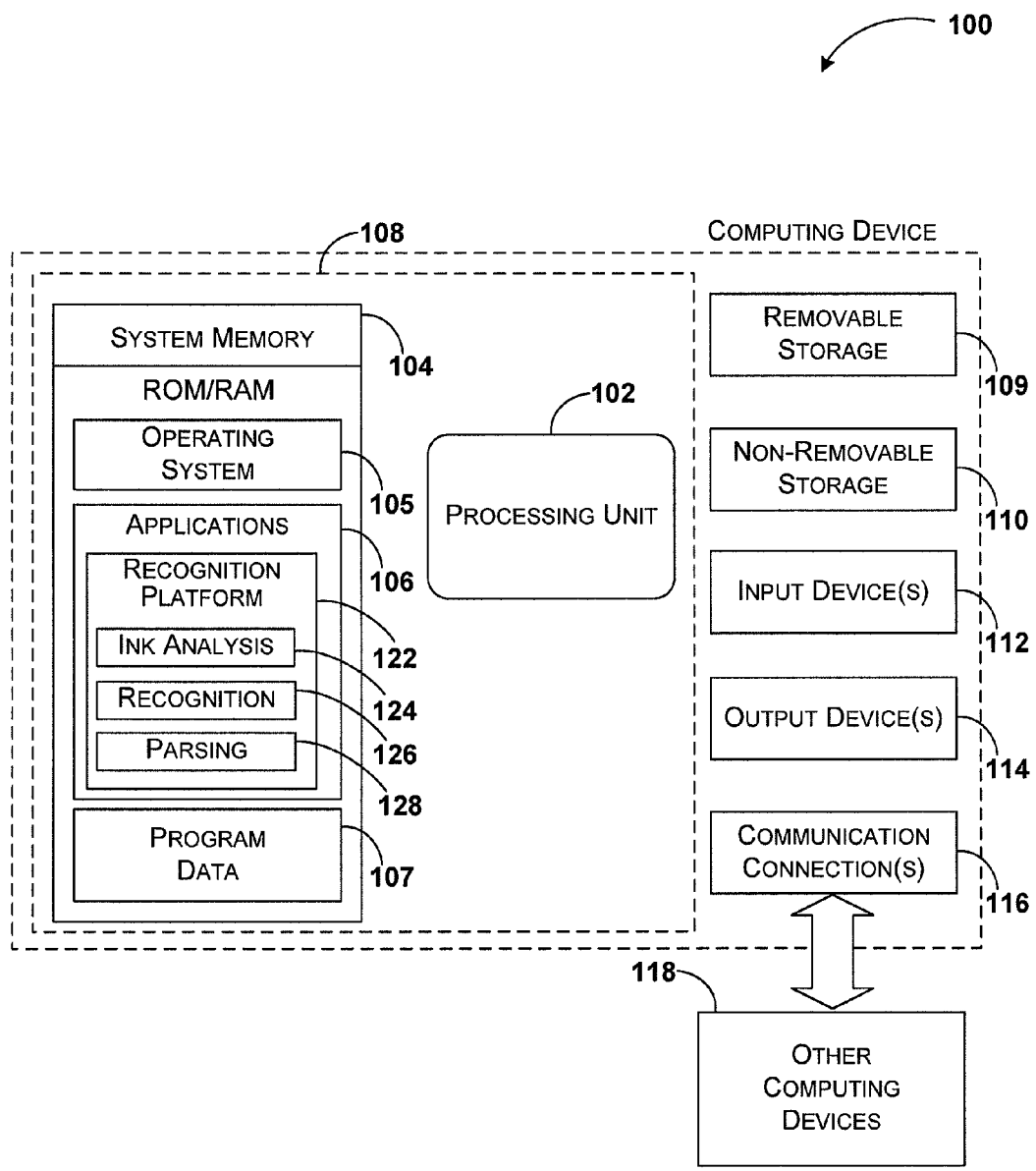
FIG. 1 illustrates a computing device that may be used according to an example embodiment.

Referring to FIG. 1, an example system for implementing the invention includes a computing device, such as computing device 100. In a basic configuration, computing device 100 typically includes at least one processing unit 102 and system memory 104. Depending on the exact configuration and type of computing device, system memory 104 may be volatile (such as RAM), non-volatile (such as ROM, flash memory, and the like) or some combination of the two. System memory 104 typically includes an operating system 105, one or more applications 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110.

Computer storage media may include volatile and non-volatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included. All these devices are known in the art and need not be discussed at length here.

Computing device 100 also contains communications connection(s) 116 that allow the device to communicate with other computing devices 118, such as over a network or a wireless mesh network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

In one embodiment, applications 106 further include recognition platform 122, which is arranged to provide a binary persistence format for a recognition result data structure. In one embodiment, the data structure may be a lattice structure that arranges recognition results in a hierarchical tree format that can be serialized. Recognition platform 122 may employ or interact with other applications or modules such as ink analysis application 124, recognition application 126, and parsing application 128. In another embodiment, one or more of these applications or modules may be independent from recognition platform 122 or may even reside in other computing devices.

User input may be provided through a touch-sensitive display input device (not shown), input device 112 or communication connection 116. The one or more databases may be stored in one of the storage devices of computing device 100, or in a remote storage device (not shown). Diagram application 120 may provide an output, which is typically a binary file or another file containing the generated recognition lattice to output device 114, one of the storage devices, or to an external device, such as a networked printer, through communication connection 116.

Illustrative Embodiments for Providing a Binary Persistence Format for Recognition Result Lattice Embodiments of the present invention are related to a system and method for providing a binary persistence format to store recognition data in a compactable binary lattice structure.

Incremental analysis works well within a given session or instance of an ink analysis object in an ink analysis application. An ink analysis application may not be able to perform incremental analysis after the ink is persisted to disk. To perform the analysis after persistence to a storage medium requires saving large amounts of ink data along with a persisted form of the analysis results. With persistence of ink data, the analysis results may be loaded when the ink data is loaded and injected into a new instance and accept any modifications as incremental changes to the existing state, rather than re-analyze everything. According to one aspect of the present invention, the saved data is separated into manageable units.

Since the ink analysis information is separated into manageable units, developers may create more powerful features. As an example, a "tap to select word" feature may be extended into "a tap once to select the word, tap twice to select the entire line and tap three times to select the entire paragraph" feature. By leveraging the tree structure returned by the analysis operation, the developer may relate the tapped area back to a stroke in the tree. Once a stroke is found, a search may be performed up the tree to determine how many neighboring strokes need to be selected.

The structure provides many possibilities including use of different types of hierarchical structures the parser may detect; ordered and unordered list, tables, shapes, flow charts, and even annotative comments written inline with text. The types of features may vary from application to application based on their needs and the available parse and recognition engines.

Figure 2:
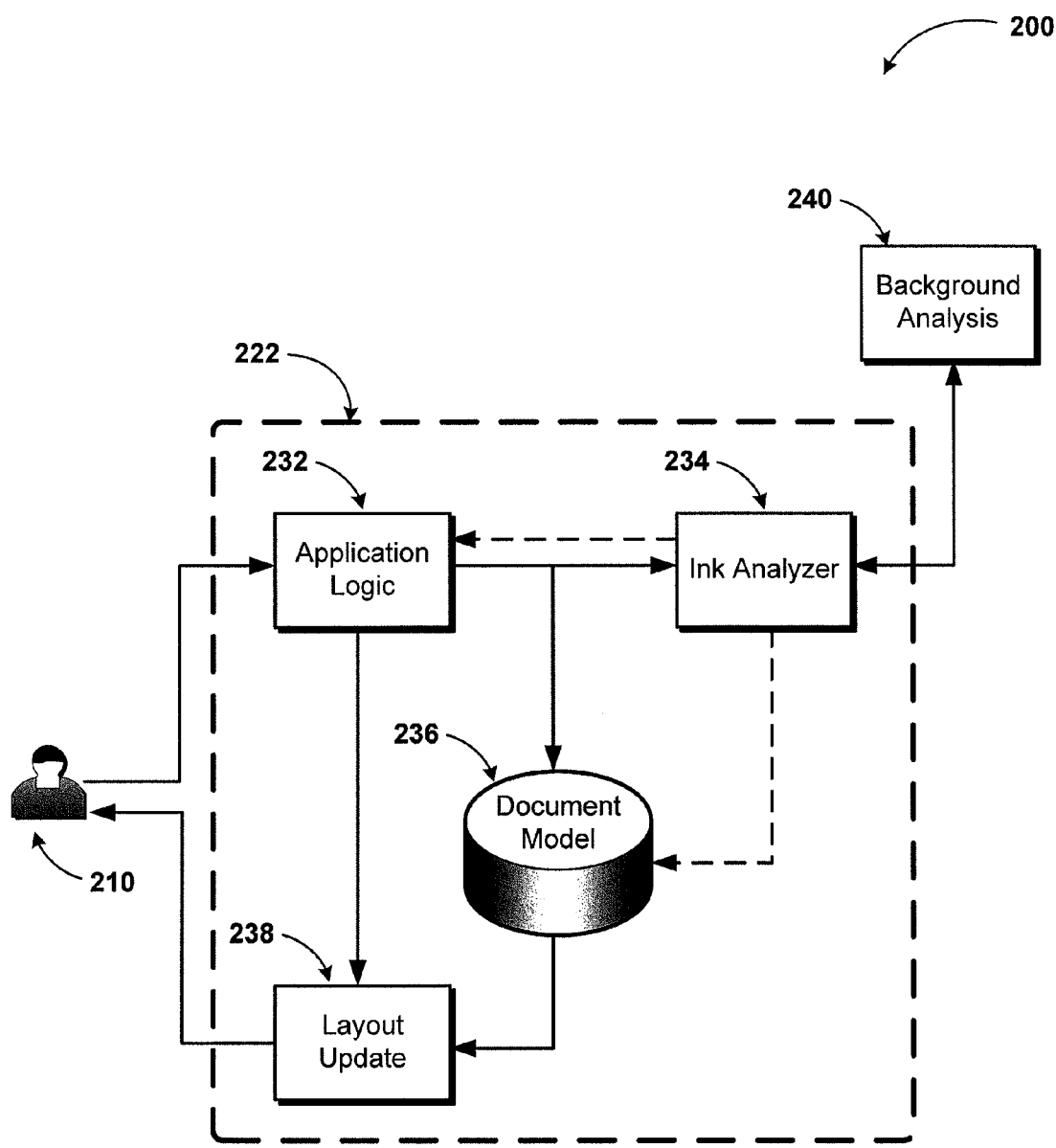
FIG. 2 illustrates a functional block diagram of an example recognition platform.

FIG. 2 illustrates a functional block diagram of example recognition platform 222 with a user and peripheral application. Example recognition platform 222 may be executed in a computing device such as computing device 100 of FIG. 1.

Recognition platform 222 may include functional blocks application logic 232, ink analyzer 234, document model 236 and layout update 238. In an example application, user 210 may create new data such as writing on a tablet PC. Some applications may receive both ink data and non-ink data.

Application logic 232 may analyze the incoming data and update ink analyzer 234 and document 236. In case of combined ink and non-data, it may be essential to provide both to document model such that layout update can render user 210 new data based on synchronized ink data and non-ink data.

In one embodiment, ink analyzer 234 may receive the ink data and provide analysis results to one or both of document model 236 and application logic 232. In another embodiment, ink analyzer 232 may start a background analysis operation 240, which may perform part of the ink analysis based on predetermined parameters.

By rendering new data to user 210 recognition platform 222 enables user 210 to interact with the analysis application. For example, new data rendered to user 210 may include a suggested top string based on the analysis of the handwriting along with a predetermined number of alternative strings each with a score or confidence index. If the top string is not what user 210 intended to write, user 210 may select the correct string among the alternatives and continue writing.

In a further embodiment, the interaction with user 210 may enable user 210 to annotate the ink, provide non-text input such as drawings, and the like. All or portions of recognition platform 222 may reside on the same machine or on separate machines that are arranged to communicate with each other.

Figure 3:
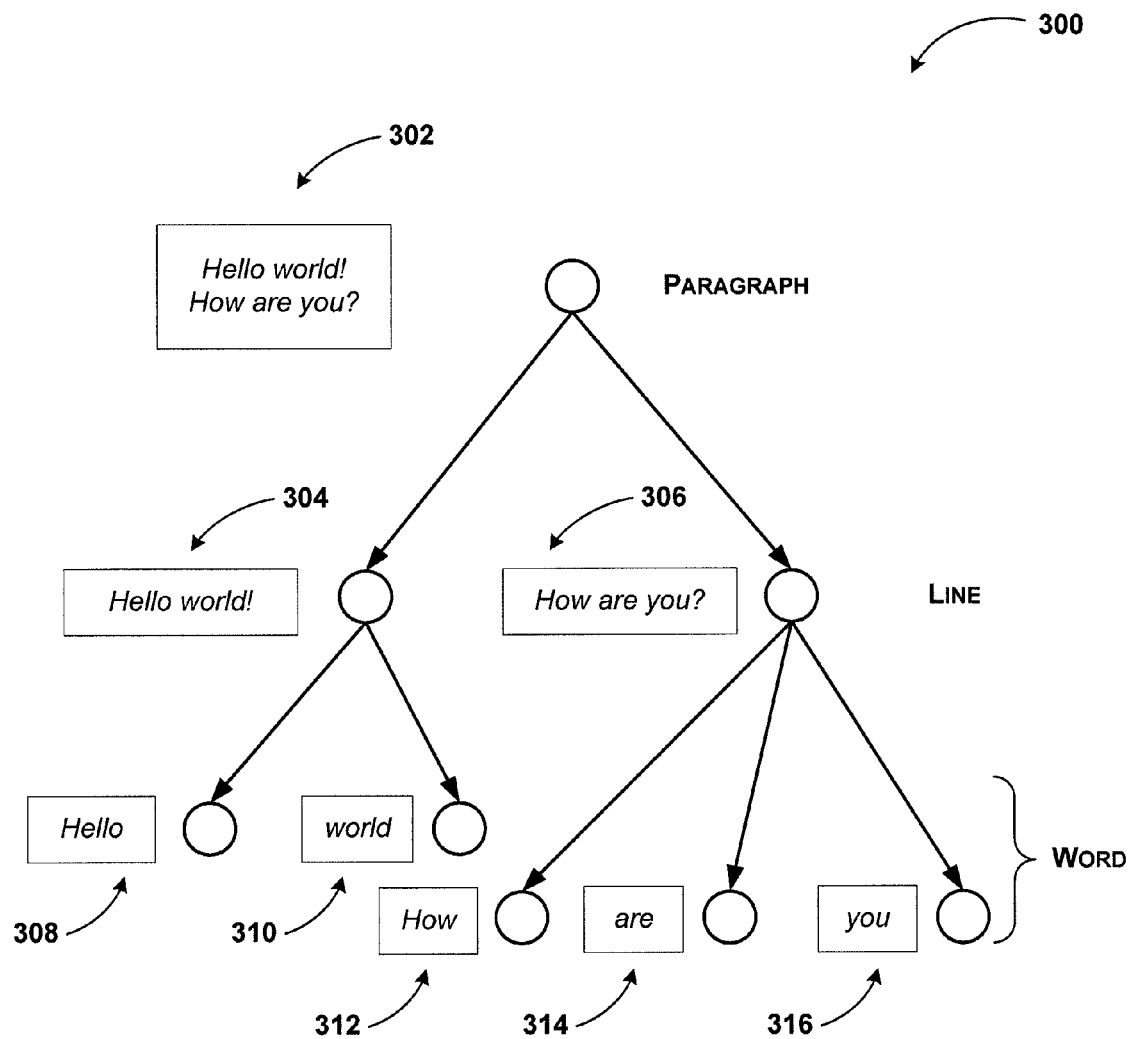
FIG. 3 illustrates an example parsing of text for a lattice structure according to another example embodiment.

FIG. 3 illustrates example parsing of document 300 for a lattice structure according to another example embodiment. A recognition platform employing a binary persistence format such as recognition platform 122 of FIG. 1 may accept recognition results from a variety of ink analysis applications.

Different ink analysis applications may take varying approaches to text parsing. FIG. 3 shows examples of such parsing techniques.

For most applications, a top level unit for text to be recognized is paragraph 302. Some applications perform ink analysis at the paragraph level, while others further parse the text. The top level unit paragraph is composed of lines such as lines 304 and 306. Some applications perform ink analysis at the line level.

Lines may be composed of words such as words 308-316. For some applications, a word may be the unit level for performing ink analysis. Once an ink analysis application performs the analysis, it typically generates data associated with the handwriting content such as strokes, suggested alternatives, metrics, and the like. Depending on the analysis application, such data may be generated on the paragraph level, line level, or word level. Each level of parsing may correspond to one or more nodes in the tree structure. In one embodiment, the entire document 300 may be represented in reference to a single root node. Any number of nodes may be associated with any type of document as long as they facilitate the representation of the document in a document tree structure.

The recognition platform, according to one embodiment, is enabled to accept any of these recognition results and save the associated data in an efficient format such that it can be used again. While an example parsing structure is illustrated in FIG. 3, the invention is not limited to the shown structure. Other methods of parsing handwriting may be employed in generating recognition results that may include additional or fewer levels of parsing, non-text recognition (drawings), and the like.

Figure 4A:
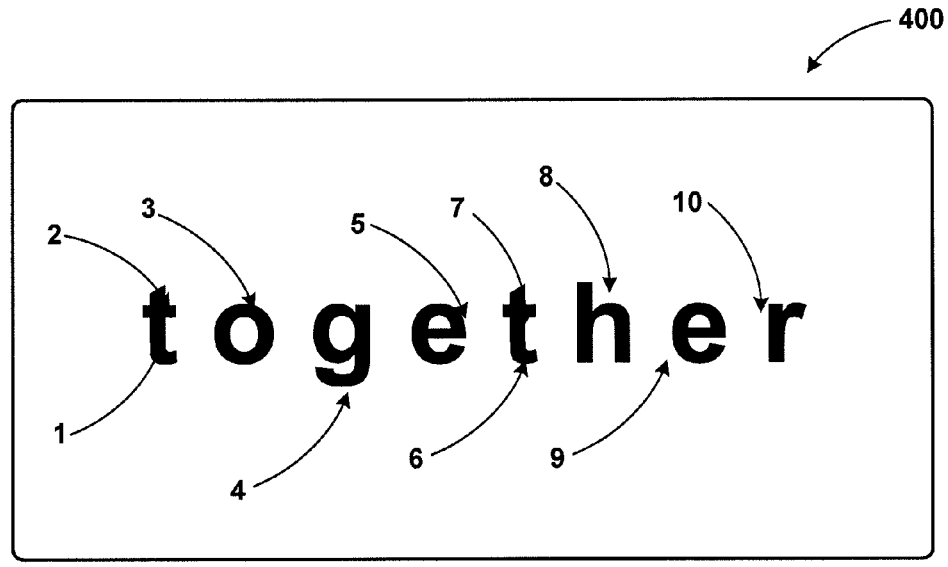
FIG. 4A is a diagram illustrating an example numbering of strokes of handwriting.

FIG. 4A is a diagram illustrating an example numbering of strokes of handwriting 400. As mentioned above, an ink analysis application may approach handwriting recognition at various levels. A basic level for handwriting recognition may be number and type of strokes. For example, each word in handwriting 400 comprises letters. The ink analysis application may assign one or more stroke numbers to the letters, which are later used to determine combinations of words, phrases etc.

In the example handwriting 400, first letter "t" is assigned two strokes (1 and 2). The letters "o", "g", and "e" following "t" are ach assigned one stroke (3, 4, and 5). This is followed by another "t" with two strokes (6 and 7) and three single stroke letters "h", "e", and "r" (strokes 8, 9, 10).

The numbers assigned to the strokes may be used to determine an order of the strokes, to compute a score assigned to each alternative string, and to determine groups of letter combinations, which form columns of the recognition lattice as shown in the next figure.

Figure 4B:
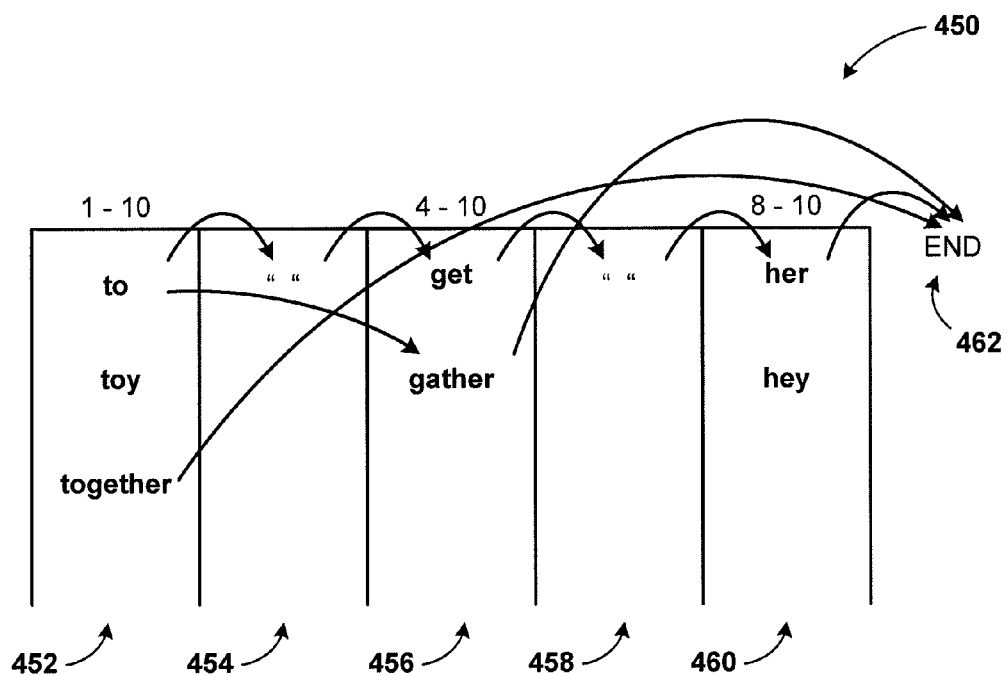
FIG. 4B is a diagram illustrating example lattice columns based on the numbering of the strokes of FIG. 4A and possible combinations including a top string and alternate strings according to an embodiment.

FIG. 4B is a diagram illustrating example lattice columns 450 based on the numbering of the strokes of FIG. 4A and possible combinations including a top string and alternate strings according to an embodiment.

Columns 452, 456, and 460 represent alternative stroke combinations within the group of strokes recognized for the example word "together" in FIG. 4A. Columns 454 and 458 represent separators between the alternative stroke combinations. Columns 452, 456, and 460 may be designated by the numbering of the strokes that may be combined for each particular column. For example, column 452 may include any combination of strokes between 1 and 10. Therefore, word combinations such as "to", "toy", and "together" are listed in column 452. Next alternative combination column 456 includes combinations of strokes between stroke numbers 4 and 10. Example alternatives for this column are: "get", "gather", etc. It should be noted, that a recognition application may return similar alternatives for words where the strokes may be alike such as "gether" and "gather." Column 460 may include alternative combinations for stroke numbers 8 through 10 such as "her", "hey", and the like.

Once the alternative stroke combinations are determined, alternative strings may be determined by assigning "next column" indices. Combinations of columns tied together by "next column" indices form alternative strings. For example, one alternative string in example lattice columns 452 is "to get her" as shown on the top of the figure.

Alternative strings may be assigned scores based on stroke numbers and prioritized such that the application can present a user with a top string and one or more alternatives to choose from. On the other hand, a prioritization system strictly based on scores calculated from strokes may return a high number of illogical alternatives. As described in conjunction with the next figure, a recognition result lattice according to one embodiment may enable the recognition platform to assign additional parameters such a confidence parameter that may be based on other selection criteria than stroke score, and suggest alternative strings based on the confidence parameter.

Figure 5:
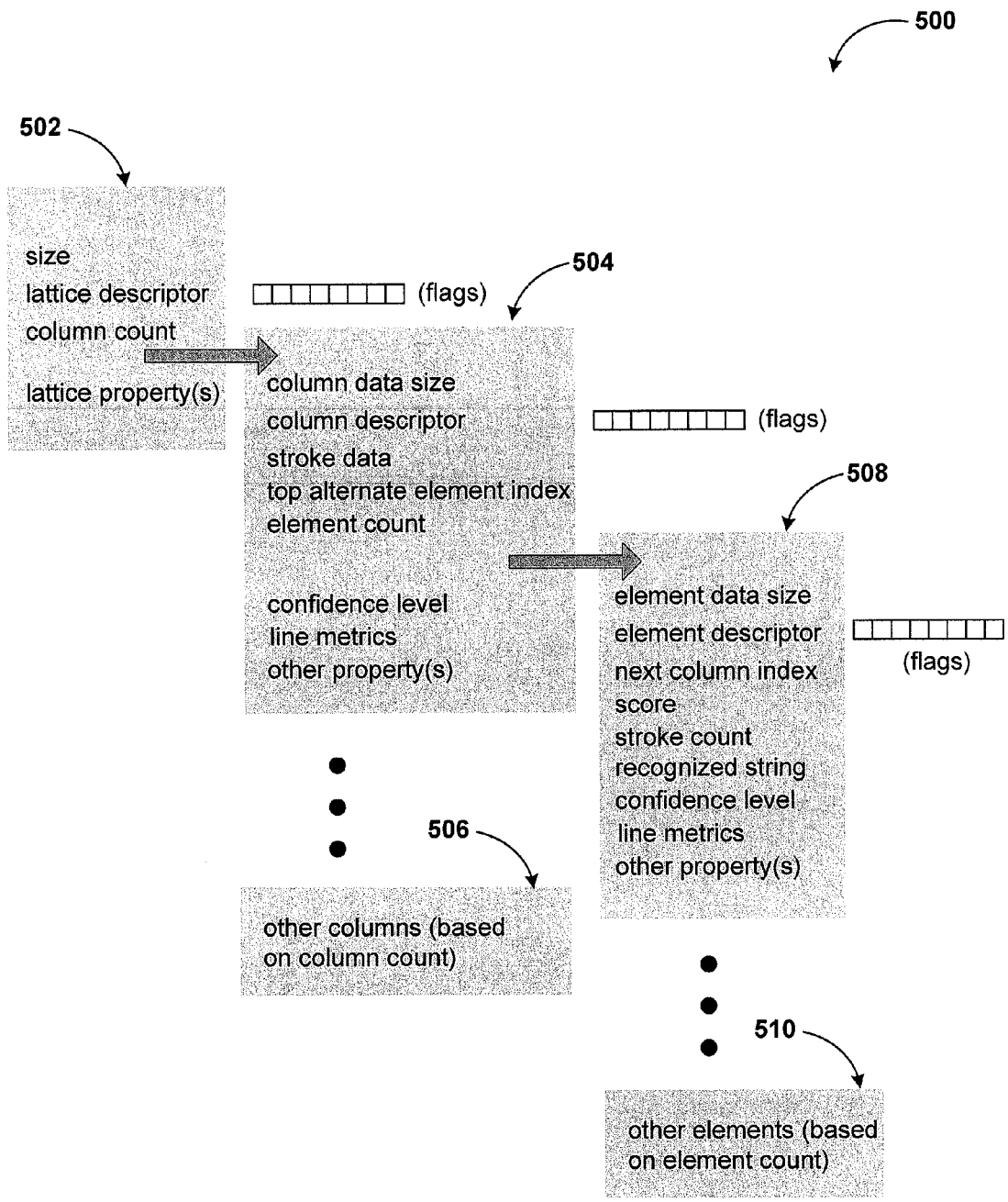
FIG. 5 is a diagram illustrating an example recognition lattice structured according to one embodiment of binary persistence format.

FIG. 5 is a diagram illustrating example recognition lattice 500 structured according to one embodiment of binary persistence format. Recognition lattice 500 is an example embodiment for storing a document structure in serialized binary format. Even though an ink document structure is referenced herein, recognition lattice 500 in serial binary format may be used to store any type of tree document structure. When recognition lattice 500 is generated, one ore more strings exist that relate to the document structure.

In one embodiment, recognition lattice 500 may be compressed for resource efficiency. The compression may include a Lempel-Ziv Welch format ("LZW format") of the strings. In another embodiment, the compression may include at least one of a ZIP algorithm, a Comité Consultatif International Téléphonique et Télégraphique (CCITT) algorithm, a Run Length Encoding (RLE) algorithm, or any other compression format that reduces the size of the strings. In a further embodiment, storage includes Multi-Bit Encoding ("MBE") values, which facilitate the storage of unsigned integers to save storage space.

Recognition lattice 500 includes a first data field reserved for lattice information. The lattice data in first data field 502 may start with size information about the lattice followed by a byte mask called lattice descriptor. The lattice descriptor is a set of flags that may be defined in one embodiment as follows:

| | |
|---|---|
| LeftSeparator | //Indicates the presence of a left separator |
| RightSeparator | // Indicates the presence of right separator |
| Column | // Indicates lattice contains single column |
| Columns | // Indicates lattice contains multiple columns. |
| Default | // Indicates an empty lattice |

Information may be stored in a specified format in a data stream and the sequence of data in the persisted stream is governed by the flags in the lattice descriptor. A lattice may or may not have column information. If it also does not have left and right separator, the serialized size of the lattice data is 0. As indicated above, one or more of the above data may include MBE.

If the lattice descriptor indicates presence of a left and/or right separator, the descriptor is followed by data indicating the separator(s). Similarly, if the lattice descriptor indicates multiple columns, the separator(s) are followed by a column count. In case of one or more columns, the column count in first data field 502 is followed by second data field(s) (e.g. 504, 506). First data field 502 ends with data associated with lattice properties.

A structure of second data field 504 is similar to the structure of first data field 502. Second data field 504 includes data about a first column in the lattice. If the lattice includes multiple columns, second data field is followed by similarly structured data fields (e.g. 506) representing further columns.

Second data field 502 begins with size information about the first column. Column size information is followed by a column descriptor, which is a collection of flags describing the lattice column representation inside the persisted stream. In one embodiment, the column descriptor may be defined as:

```
StrokeIds                        // Indicates the presence of stroke id collection
StrokeId                         // Indicates the presence of 1 stroke id
StrokeIdContiguous               // Indicates multiple stroke ids in sequence.
TopAlternateElement              // Indicates presence of top alternate
Element                          // Indicates the presence of single element
Elements                         // Indicates the presence of multiple elements
RecognitionPropertyConfidenceLevel // Indicates confidence data
RecognitionPropertyLineMetrics   // Indicates line metrics data
MoreRecognitionProperties        // More recognition properties
Default                          // Indicates a default lattice column
```

The lattice column descriptor not only defines the presence of different components of the lattice column, but it also specifies the order in which they appear in the serialized stream.

If the StrokeIds flag is present in the descriptor, it implies that the first data in the stream is a count of stroke ids (stroke numbers) and the stroke Ids themselves.

If the StrokeId flag is present in the descriptor, it implies that the first data in the stream is a value of the stroke id itself and there is only one stroke for this column.

If the StrokeIdContiguous flag is present in the descriptor, it may imply that here are multiple strokes for this column and the stroke ids are in sequence and are incremented by 1. In that case, the count of strokes may be written first for this column followed by the first id. The subsequent stroke ids may be obtained by adding one to the previous id.

If the TopAlternateElement flag is set in the descriptor, it implies the current location of the stream holds a value of the index into the list of elements that is the top alternate element.

If the Element flag is set, it implies only one element in the column. On the other hand, if the Elements flag is set, it implies more than one element in the column. In that case, first a count of elements is placed in the current position in the stream. This is followed by third data field(s) (e.g. 508, 510).

Third data field(s) are followed by column property information such as RecognitionPropertyConfidenceLevel. If this flag is set, it implies the presence of known recognition property confidence level in the stream. Confidence level may be a signed multi byte encoded integer.

If the RecognitionPropertyLineMetrics flag is set, it implies the presence of known line metrics in the stream. Line metrics is a property associated with alignment of lines of text and may include information such as baseline coordinates, midline offset, etc.

In one embodiment, second data field 504 may include additional property information associated with the column. If MoreRecognitionProperties flag is set, it implies both known and custom properties in the stream. These properties may include information such as boldness, line numbering, and other application-specified properties.

Third data field 508 following element count in second data field 504 includes information associated with element(s) of the column and is structured in a similar way to second data field 504. If there are multiple elements within the column, third data field 508 is followed by additional third data field(s) (e.g. 510). Similar to second data field 504, third data field 508 begins with size information about the element data. Element data size information is followed by an element descriptor, which is a collection of flags describing the lattice element representation inside the persisted stream. In one embodiment, the element descriptor may be defined as:

```
NextColumn                        // Indicates presence of next column index
Score                             // Indicates presence of non-zero Score
StrokeCount                       // Indicates presence of stroke Count
DataString                        // Indicates the presence of data string
RecognitionPropertyConfidenceLevel // Indicates presence of
                                     recognition confidence data
RecognitionPropertyLineMetrics    // Indicates line metrics data
MoreRecognitionProperties         // Indicate more recognition
                                     properties
Default                           //Indicates a default lattice column
```

The lattice element descriptor not only defines the presence of different components of the lattice element, but it also specifies the order in which they appear in the serialized stream.

If the NextColumn flag is present in the descriptor, it implies that the first data in the stream is a value of next column index for this element.

If the Score flag is set in the descriptor, it implies the current location of the stream holds a value of the non-zero score for the element.

If the StrokeCount flag is set, it implies a value of the non-zero stroke count associated with the element.

If the DataString flag is set, it implies the string data associated with this element is inside the stream and may be loaded from the current position.

If the RecognitionPropertyConfidenceLevel flag is set, it implies the presence of known confidence level in the stream. Confidence level may be a signed multi byte encoded integer.

If the RecognitionPropertyLineMetrics flag is set, it implies the presence of known line metrics in the stream.

If the MoreRecognitionProperties flag is set, it implies both known and custom properties in the stream. The known recognition properties may be written after the element data have been written into the stream. If the element has any other known (apart from confidence level and line metrics) or custom recognition property, it may be saved at this position in the stream.

Similar to first data field 502, some or all of the data in the second data fields and the third data fields may include MBE. The specific flags and data types described above are for illustrative purposes and the present invention may be implemented with fewer or additional flag and data types. Moreover, fewer or additional data fields may be defined depending on a structure of recognition lattice 500.

Figure 6:
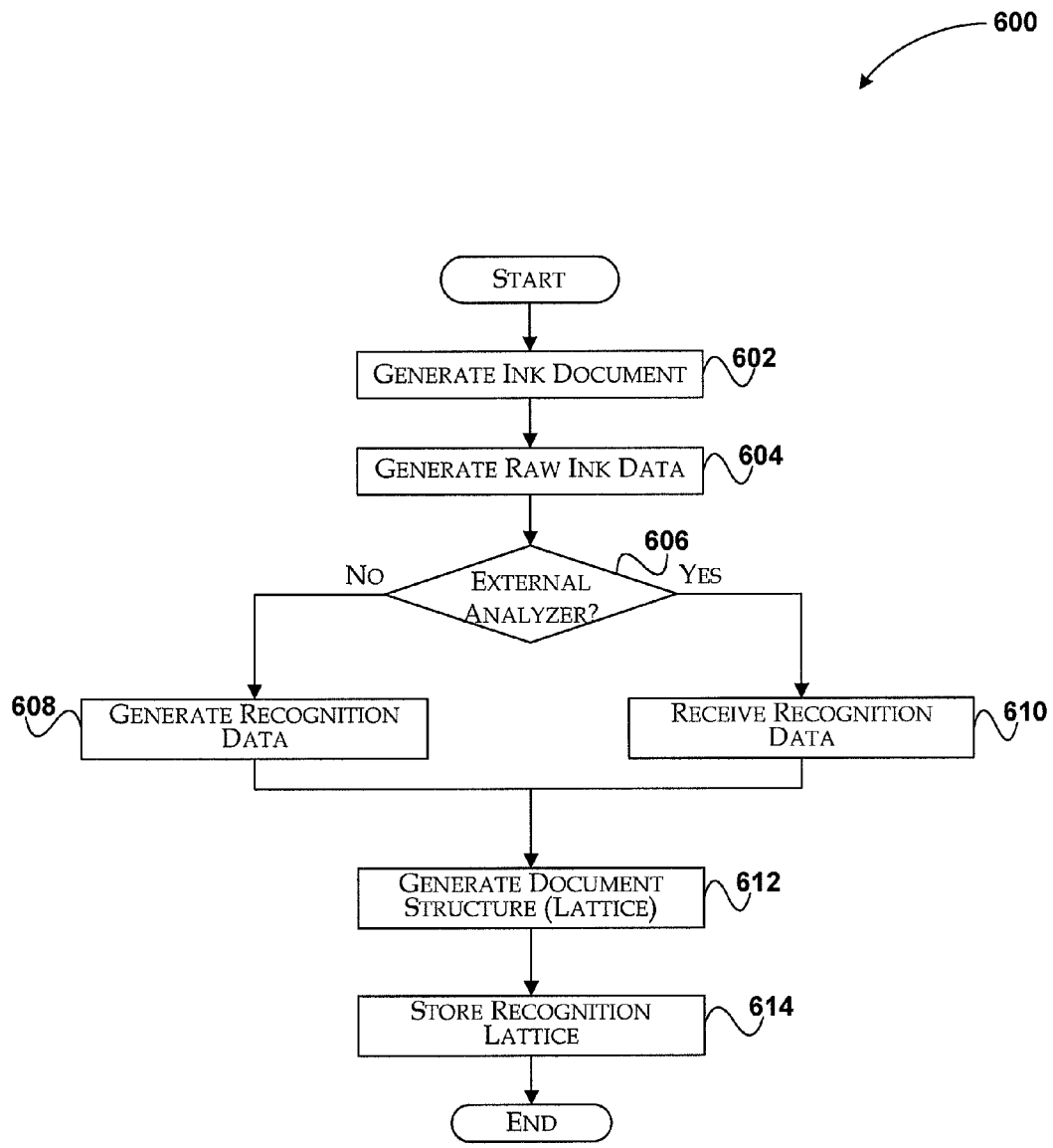
FIG. 6 is a logic flow diagram illustrating a process for storing recognition data in a lattice.

FIG. 6 is a logic flow diagram illustrating a process for storing recognition data in a lattice. Process 600 may be performed by recognition platform 122 of FIG. 1. Process 600 begins at block 602, where an ink document is generated. Generating the ink document may include employing a digitizer for digitizing stroke inputs from a user. The digitizer may include a computing device (e.g. computing device 100 of FIG. 1), a mobile computing device, a tablet PC, or any device that facilitates the operation of a recognition application. Moreover, process 600 may be implemented in relation to any type of data. For example, the present invention may also be used in association with a word processing application, spreadsheet application, drawing application, graphics application, notes application, picture application, and the like. Processing moves to block 604 next.

At block 604, raw ink data is generated. In one embodiment, generating raw ink data includes a digitizer converting stroke inputs into raw ink data and storing the raw ink data to a raw data storage, transmitting the raw ink data to an application, and the like. Processing advances to decision block 606 next.

At block decision 606, a determination is made whether an external ink analyzer is to be used or not. If an external analyzer is to be used, processing moves to block 610. If the ink analysis application is integrated into the recognition platform, processing flows to block 608.

At block 608, recognition data is generated. As described previously, generating recognition data may involve a variety of approaches in parsing the handwriting at paragraph level, line level, and word level. In addition to recognizing text, an analysis application may further recognize drawings, tables, and other non-text entries. Furthermore, recognition may involve annotations on already recognized handwriting. In one embodiment, recognition may be an iterative process, where the user is provided choices among alternative strings and the process continued based on the user's selection. Processing proceeds from block 608 to block 612.

At block 610, recognition data is received from the external analyzer. The external analyzer may be a separate application residing on the same computing device, on a second computing device that is coupled to the first computing device running the recognition platform through a network, a direct link, and the like. Processing then moves to block 612.

At block 612 a document structure (e.g. a recognition lattice) is generated based on the received data. The document structure may be generated as described above in accordance with FIG. 5. The document structure may include a hierarchical tree structure with a plurality of nodes that correlate to inking. For example, the document structure may include a lattice node, one or more column nodes under the lattice node, and one or more element nodes under each column node. These nodes may correlate to a tree structure comprising one or more paragraph nodes, line nodes, word nodes and stroke nodes.

Each node may include information associated with content, properties, and relations of that node to other nodes. In another embodiment, the ink document structure may also include a drawing node and/or a hint node. It is contemplated that the ink document structure may include any type of node that facilitates a binary tree representation of the inking. Processing advances to block 614 from block 612.

At block 614, the recognition may be stored for global accessibility. In one embodiment, the lattice structure may be compressed and stored as set forth above in conjunction with FIG. 5. In such a case, inking may be generated in conjunction with an application and then stored for accessibility to other applications. Stated another way, other applications associated with the platform may utilize the ink document structure and the raw ink to regenerate the analyzed ink. This accessibility facilitates cut and paste operations between applications. Also, the ink may be modified without requiring reanalysis of the entire ink document inasmuch as the ink has been parsed, recognized and saved in a serialized format. After block 614, processing proceeds to a calling process for further actions.

The blocks included in process 600 are for illustration purposes. A recognition lattice with binary persistence format may be implemented by a similar process with fewer or additional steps including customization of hierarchical levels and contents of each level.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for storing ink recognition data, the method comprising:
    parsing an electronic ink document to generate a hierarchy having a plurality of hierarchical nodes;
    generating a recognition lattice that correlates to at least one node of the hierarchy generated from the parsing of the electronic ink document, wherein generating the recognition lattice includes generating a lattice information field, wherein generating the lattice information field includes:
        generating a lattice descriptor field, wherein the lattice descriptor field includes a plurality of settable flag fields, wherein at least one of the settable flag fields includes a settable column flag field,
        determining whether a column flag is set within the settable column flag field of the lattice descriptor field,
        when the column flag field of the lattice descriptor is set with a column flag,
            generating a column count field, in the lattice descriptor field, that indicates a count of columns of the lattice,
            latticing a column recognition field, into the column count field, for each column indicated by the count of columns of the lattice, wherein each column recognition field for each column indicated by the count of columns of the lattice includes column properties of a respective column; and
    persisting the generated recognition lattice in a binary format to facilitate the regeneration of the electronic ink document from the binary persistence of the recognition lattice.

2. The computer-implemented method of claim 1, wherein the settable column flag field is a settable single column flag field.

3. The computer-implemented method of claim 1, wherein the settable column flag field is a settable multiple column flag field.

4. The computer-implemented method of claim 1, wherein at least one of the settable flag fields is a left separator flag field.

5. The computer-implemented method of claim 4, wherein at least one of the settable flag fields is a right separator flag field.

6. The computer-implemented method of claim 5, further comprising a generating a lattice size field, wherein the lattice size field stores an identifier that indicates the size of the recognition lattice.

7. The computer-implemented method of claim 6, further comprising setting the lattice size field to null when the column flag field of the lattice descriptor is not set with a column flag, when a left separator flag is not set in the left separator flag field and when a right separator flag is not set in the right separator flag field.

8. A computer-readable storage medium on a memory having computer-executable instructions for storing ink recognition data, the instructions comprising:

generating a recognition lattice that correlates to at least one node of the hierarchy generated from a parsed electronic ink document, wherein generating the recognition lattice includes generating a lattice information field, wherein generating the lattice information field includes:

generating a lattice descriptor field, wherein the lattice descriptor field includes a plurality of settable flag fields, wherein at least one of the settable flag fields includes a settable column flag field, determining whether a column flag is set within the settable column flag field of the lattice descriptor field, when the column flag field of the lattice descriptor is set with a column flag, generating a column count field, in the lattice descriptor field, that indicates a count of columns of the lattice, latticing a column recognition field, into the column count field, for each column indicated by the count of columns of the lattice, wherein each column recognition field for each column indicated by the count of columns of the lattice includes column properties of a respective column; and persisting the generated recognition lattice in a binary format to facilitate the regeneration of the electronic ink document from the binary persistence of the recognition lattice.

9. The computer-readable storage medium of claim 8, wherein the settable column flag field is at least one member of a group comprising: a settable single column flag field, and a settable multiple column flag field.

10. The computer-readable storage medium of claim 8, wherein at least one of the settable flag fields is a left separator flag field.

11. The computer-readable storage medium of claim 10, wherein at least one of the settable flag fields is a right separator flag field.

12. The computer-readable storage medium of claim 11, further comprising a generating a lattice size field, wherein the lattice size field stores an identifier that indicates the size of the recognition lattice.

13. The computer-readable storage medium of claim 12, further comprising setting the lattice size field to null when the column flag field of the lattice descriptor is not set with a column flag, when a left separator flag is not set in the left separator flag field and when a right separator flag is not set in the right separator flag field.

14. A system for storing ink recognition data, the system comprising:

a processor; and a memory having computer-executable instructions stored thereon, wherein the computer-executable instructions are configured for:

generating a recognition lattice that correlates to at least one node of the hierarchy generated from an electronic ink document, wherein generating the recognition lattice includes generating a lattice information field, wherein generating the lattice information field includes:

generating a lattice descriptor field, wherein the lattice descriptor field includes a plurality of settable flag fields, wherein at least one of the settable flag fields includes a settable column flag field, determining whether a column flag is set within the settable column flag field of the lattice descriptor field, when the column flag field of the lattice descriptor is set with a column flag, generating a column count field, in the lattice descriptor field, that indicates a count of columns of the lattice, latticing a column recognition field, into the column count field, for each column indicated by the count of columns of the lattice, wherein each column recognition field for each column indicated by the count of columns of the lattice includes column properties of a respective column; and persisting the generated recognition lattice in a binary format to facilitate the regeneration of the electronic ink document from the binary persistence of the recognition lattice.

15. The system of claim 14, wherein the settable column flag field is a settable single column flag field.

16. The system of claim 14, wherein the settable column flag field is a settable multiple column flag field.

17. The system of claim 14, wherein at least one of the settable flag fields is a left separator flag field.

18. The system of claim 17, wherein at least one of the settable flag fields is a right separator flag field.

19. The system of claim 18, further comprising a generating a lattice size field, wherein the lattice size field stores an identifier that indicates the size of the recognition lattice.

20. The system of claim 19, further comprising setting the lattice size field to null when the column flag field of the lattice descriptor is not set with a column flag, when a left separator flag is not set in the left separator flag field and when a right separator flag is not set in the right separator flag field.

* * * * *